United States Patent
Chapman et al.

(10) Patent No.: US 6,493,316 B1
(45) Date of Patent: Dec. 10, 2002

(54) APPARATUS FOR AND METHOD OF MANAGING BANDWIDTH FOR A PACKET BASED CONNECTION

(75) Inventors: Alan Stanley John Chapman, Kanata (CA); Hsiang-Tsung Kung, Lexington, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/201,799

(22) Filed: Dec. 1, 1998

(30) Foreign Application Priority Data

Sep. 30, 1998 (CA) .............................................. 2249152

(51) Int. Cl.[7] ................................................. G06F 11/00
(52) U.S. Cl. ...................... 370/231; 370/232; 370/233; 370/477
(58) Field of Search ................................ 370/229, 230, 370/231, 232, 233, 236, 238, 468, 470, 477, 235

(56) References Cited

U.S. PATENT DOCUMENTS

| 5,163,046 A | * | 11/1992 | Hahne et al. | 370/237 |
|---|---|---|---|---|
| 6,023,453 A | * | 2/2000 | Ruutu et al. | 370/229 |
| 6,038,216 A | * | 3/2000 | Parker | 370/231 |
| 6,076,114 A | * | 6/2000 | Wesley | 709/235 |
| 6,105,064 A | * | 8/2000 | Davis et al. | 709/224 |
| 6,205,120 B1 | * | 3/2001 | Packer et al. | 370/235 |
| 6,215,769 B1 | * | 4/2001 | Ghani et al. | 370/230 |
| 6,219,713 B1 | * | 4/2001 | Ruutu et al. | 709/235 |

* cited by examiner

Primary Examiner—Hassan Kizou
Assistant Examiner—Saba Tsegaye
(74) Attorney, Agent, or Firm—Dennis R. Haszko

(57) ABSTRACT

Flow control of packet based traffic by window is known. Novel modification is described which causes the flow control mechanism to reduce sending rate to some configured number rather than just reducing it by a fixed amount such as one half. The description also shows how the flow control mechanism can be constrained to a maximum rate. The configured numbers will assure that the connection can always run at a minimum rate but not more than a maximum rate. If the guaranteed minimum bandwidth is known and the round trip time between the end points is known or has been calculated, then the sender node needs only reduce its window to that which corresponds to a sending rate equal to that configured number. In this way the protocol will still probe for extra, opportunistic bandwidth but will be able to maintain the minimum rate. In a similar way a window that corresponds to the maximum rate can be calculated and used to constrain the maximum rate of sending.

9 Claims, 7 Drawing Sheets

When a duplicate ACK is received

... 15 16 17 18 | 19 20 21 22 23 24 25 26 27 | 28 29 30 31 32 33...

↘ Inflate Window

... 15 16 17 18 | 19 20 21 22 23 24 25 26 27 | 28 | 29 30 31 32 33...

When a non-duplicate ACK is received 19 is lost

US 6,493,316 B1

APPARATUS FOR AND METHOD OF MANAGING BANDWIDTH FOR A PACKET BASED CONNECTION

FIELD OF INVENTION

The invention resides generally in the field of digital data transmission through a network. In particular, it relates to an apparatus for and method of transmitting digital data in streams of packets while observing guaranteed minimum and/or maximum bandwidth allocations.

BACKGROUND OF INVENTION

In contrast to circuit based transport systems, a packet based transport system allows the access bandwidth to be dynamically allocated. Remote nodes can be represented as logical ports but there is no commitment of bandwidth when this is not needed. The physical access link is fully available for traffic to any destination. In a packet transport system, virtual pipes are provided between any two transport access points. These pipes may be guaranteed some minimum rate of transmission but certainly it is required that an access point can make opportunistic use of spare bandwidth up to some maximum amount. Frame relay as a packet based transport allows more efficient use of bandwidth by permitting statistical multiplexing of data streams, thus allowing it to exploit unused bandwidth. However, there is no mechanism (protocol) to ensure reliable delivery of the frames and under congestion conditions frames are discarded and the higher layer protocols must compensate for the loss. The discard of frames is not sensitive to the impact on the higher layer protocols and the frame flows do not directly adapt to the network conditions. ATM with an effective flow control can provide a lossless but dynamic transport. However, it relies on some reasonable level of complexity at the transport switching points to achieve the flow control, the effectiveness of which has not yet been proven in the field. ATM without flow control requires that cells be discarded under congestion conditions and this discard should be aware of packet boundaries and the impact on the higher layer protocol such as TCP protocol. These issues are just beginning to be understood.

It is commonly understood in the field of the present invention that a layer under the networking layer is called "transport" layer and provides pipes between networking layer nodes. This is in contrast to the layered model of the OSI (open systems interconnect) in which the transport layer resides upon the network layer, which in turn sits on top of the data link layer. The data link layer provides similar functionalities to those of the transport layer of the present description. Throughout the specification, the former designation is used.

Therefore in the TCP/IP model, IP layer resides under TCP layer. The IP layer is the network layer in which IP (Internet protocol) runs. An internetwork differs from a single network, because different parts may have wildly different topologies, bandwidth, delays, packet sizes, and other parameters. The TCP layer is the transfer layer in which the TCP (transmission control protocol) runs. The TCP has been used for ensuring reliable transfer of byte stream data between two end points over an internetwork, which may be less reliable. TCP allows a shared and adaptive use of available bandwidth of a transmission link between two end points. It does this by having the sender gradually increase the rate of sending until a packet is lost whereupon it reduces its rate significantly and repeats the gradual increase. Thus, TCP tends to give connections their proportional share of the available bandwidth on a link although different connection characteristics can cause large variations in the sharing.

In Internet terminology, aggregating traffic streams by encapsulating them into a single IP stream is often called tunneling. Applicant's copending patent application Ser. No. 09/066,888 filed on Apr. 28, 1998 describes an invention, which re-uses TCP in a packet based transport to provide TCP tunneling which can conveniently be called "TCP trunking". The use of TCP provides for reliable delivery of data between two transport access points while permitting that transport to offer elasticity and bandwidth sharing. Aggregating traffic streams into TCP tunnels reduces the size of buffers and tables in the transport switches. TCP is well suited to the use of first-in-first-out queues and allows simple implementations at the switching nodes. TCP is also inherently provides for re-sequencing of out-of-order packets which can occur when switching nodes spread load over multiple links.

It is expected that in future networks, particularly those using TCP trunking between aggregation points, it will be required to assure a minimum sending rate for the connection while still allowing the connection to probe for more throughput if it is available. This opportunistic acquisition of bandwidth might be limited to some maximum. TCP currently has no capability to support a guaranteed minimum bandwidth or a maximum permitted bandwidth but this will be essential as IP networks introduce virtual private networks with performance guarantees. The present invention offers a good solution to such a problem.

It should be noted that in a carrier owned transport network the TCP functionality would be in transport access points rather than host computers, the variability of paths will be low and parameters such as connection round trip time will be very stable. These features make it much easier to envisage modifications to the TCP protocol for these networks. However, the use of this invention can be more generally applied to other TCP hosts and other sliding window protocols.

Many flows on today's networks carry only a small amount of information, say ten or twenty packets, and the rate adaptation feature of TCP is not as relevant as the reliability feature. Providing reliability without incurring TCP time-outs on the loss of a single packet would greatly improves user throughput and network efficiency.

OBJECTS OF INVENTION

It is therefore an object of the invention to provide sliding window based flow control for point-to-point connections in a packet network, which constrain the minimum and/or maximum bandwidths available to that connection.

It is another object of the invention to provide modifications to the TCP protocol to provide for constraining the minimum and/or maximum bandwidths achieved by the connection.

It is yet an object of the invention to ensure the absence of TCP retransmission timeouts for flow with small windows by maintaining a minimum rate of sending.

SUMMARY OF INVENTION

Briefly stated, in accordance with one aspect, the invention is directed to a method of sending data in packets via a connection by way of sliding window algorithm in which a flow of data into the connection is controlled in response to acknowledged packets and the connection observing either or both of a guaranteed minimum bandwidth and a maximum permitted bandwidth. The method comprises steps of (1) calculating a congestion window hereinafter called C-WND of the connection, (2) setting either or both of a guaranteed minimum bandwidth and a maximum permitted bandwidth and then respectively calculating either or both of a guaranteed minimum bandwidth window hereinafter called MIN-WND and a maximum permitted bandwidth window hereinafter called MAX-WND. The method further includes steps of (3) determining if the MIN-WND or MAX-WND is invoked on the connection, based on their relationship with C-WND and (4) allowing the transmission of one or more packets of data into the connection if either MIN-WND or MAX-WND permits said transmission.

According to another aspect, the invention is directed to an apparatus for sending data in packets via a connection by way of sliding window algorithm in which a flow of data into the connection is controlled in response to acknowledged packets and the connection observing either or both of a guaranteed minimum bandwidth and a maximum permitted bandwidth. The apparatus comprises a flow control module for controlling a flow of packets into the connection in response to acknowledged packets, a congestion window arithmetic module for calculating a congestion window hereinafter called C-WND of the connection and a bandwidth monitoring window arithmetic module for calculating either or both of a guaranteed minimum bandwidth window hereinafter called MIN-WND and a maximum permitted bandwidth window hereinafter called MAX-WND. The apparatus further includes control logic module for determining if the MIN-WND or MAX-WND is invoked on the connection, a transmitter for transmitting a series of packets of data into the connection and a controller for allowing the transmission of one or more packets of data into the connection if either MIN-WND or MAX-WND permits said transmission.

DETAILED DESCRIPTION OF PREFERRED EMBODIMENTS OF INVENTION

Figure 1:
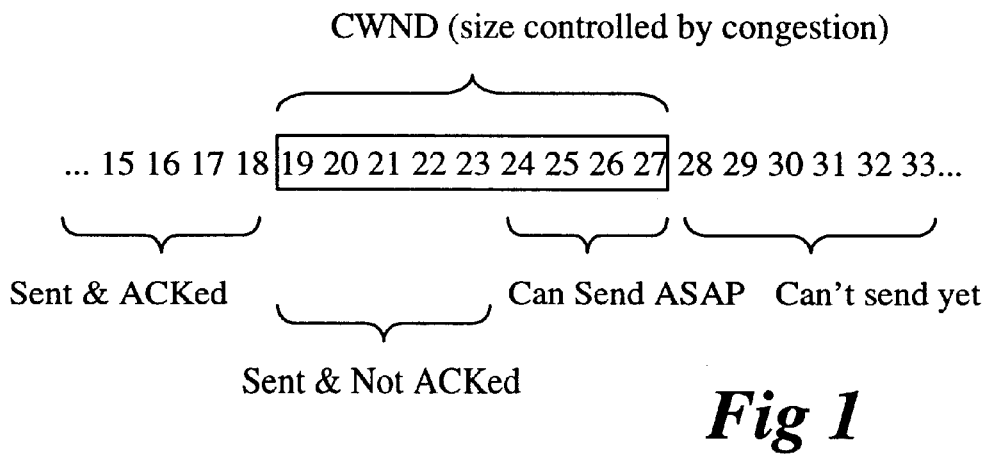
FIG. 1 is an illustration showing the nature of the sliding window algorithm.

When providing services with bandwidth guarantees, a packet transport network should be able to emulate the circuit-based mesh in that a defined minimum bandwidth can be allocated between any pair of nodes. However, unused bandwidth should be made available to other flows in a dynamically shared fashion so that a flow can opportunistically exceed its minimum. In some cases it is also useful to implement a maximum limit on how much extra bandwidth a pair of nodes can use.

The conventional IP network implements bandwidth sharing among host machines using the transport control protocol (TCP). In TCP the sender (sender host machine) constantly tests the network to see if more bandwidth is available and uses the loss of a packet determined by sequence numbers of TCP packets as an indication to decrease its rate. Any lost packets are sent again so that there is a reliable flow of traffic. The loss of too many packets can cause the TCP connection to enter the timed out state. Consecutive timeouts are increased in an exponential way until eventually the connection is closed.

The general characteristic of TCP is that it is self-clocking. That is to say, the sender will wait for an acknowledgment from the receiver for the packets already sent before sending more packets. If the sender waited for each individual packet to be acknowledged then the maximum rate that the connection could achieve would be one packet per round trip time of the connection. To increase the sending rate while keeping the self clocking nature of the protocol, the sender is allowed to send some number of packets while waiting for an earlier packet to be acknowledged. This number of packets is called the window. The receiver itself may constrain the size of the window in order to limit its buffer requirement.

Each packet contains a sequence number, which increases according to the number of bytes transmitted. The receiver acknowledges packets using this numbering scheme and always acknowledges the latest packet received in correct sequence. It may acknowledge each packet individually or wait in order to reduce overhead (this is called Delayed ACK). It should definitely send an acknowledgment at least every second packet. If a packet is received which is not in correct sequence the receiver will immediately send an acknowledgment but the sequence number it acknowledges will be that of the last packet which was received in the correct sequence. It should be noted that the sequence number in a packet corresponds to the last byte in the packet and the acknowledgment contains the next expected in-sequence byte number and thus acknowledges all bytes up to that number. In general terminology a packet is acknowledged when the receiver reports that the next expected byte number is later than any bytes contained in that packet.

The maximum rate of sending on a TCP connection is equal to the window size divided by the round trip time of the connection. TCP will constantly try to increase its rate by increasing the window size. When a packet is lost the window size is reduced and the gradual increase is begun again. The current size of the window is called the congestion window (C-WND) and can vary between one packet and the maximum that the receiver is prepared to accept (R-WND: receiver window).

FIG. 1 shows the nature of the sliding window. The window reflects the data sent but not yet acknowledged as well as the amount of data that can still be sent without waiting for an acknowledgement. As a packet is acknowledged the window advances so that the left-hand side is equal to the earliest unacknowledged byte number. The right hand side of the window is equal to the highest byte sequence number that can be sent before the transmitter must wait for further acknowledgements. It should be noted that the receiver will only acknowledge bytes received which are in a complete sequence. Later bytes that have been received will not be acknowledged until all previous bytes have been received.

Figure 2:
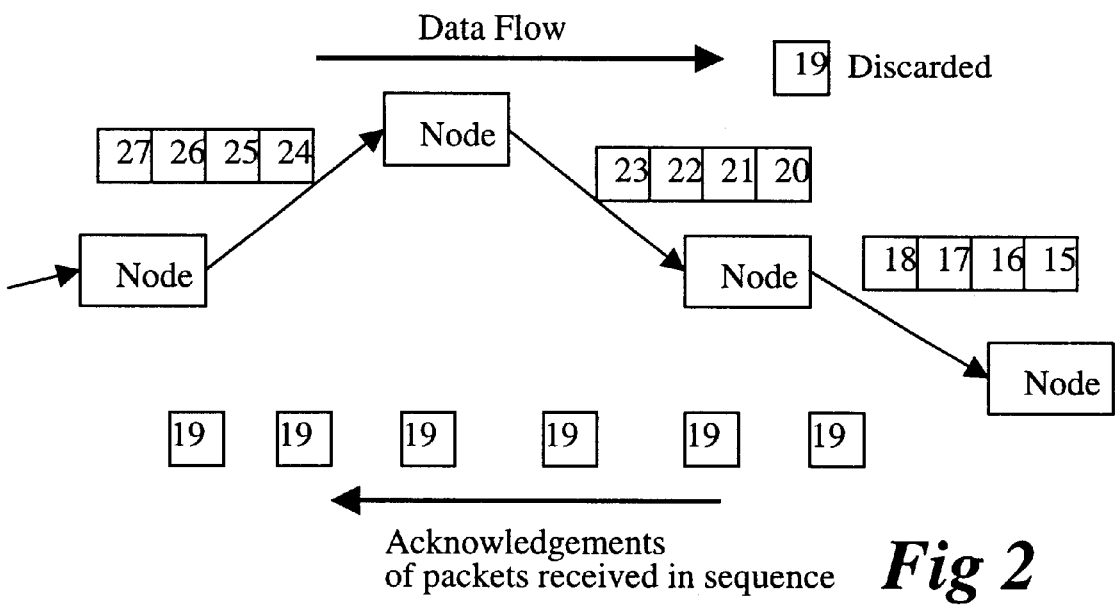
FIG. 2 shows mechanisms of acknowledgements.

Packet loss is detected in one of two ways. If the sender does not get an acknowledgment within a certain time (TCP retransmission time-out) it will assume that a packet has been lost and will reduce its C-WND size to one packet as well as resending the lost packet. If the sender sees multiple acknowledgments (called duplicate ACK) of the same packet it can decide that packet has been lost even before the retransmission time-out occurs. Many TCP implementations include this fast retransmission and recovery capability. The window size is cut in half and the lost packet is retransmitted. Avoiding time-out gives a great boost to perceived performance but it is only effective when the window is large enough to allow enough duplicate acknowledgments to be generated (usually three). This is shown schematically in FIG. 2 in which packet 19 is lost and the receiver acknowledges reception of packets up to 18. Multiples of acknowledged packets indicate that the receiver still expects packet 19. For windows smaller than about five packets, it is not possible to guarantee that fast retransmission will be invoked. Many flows on today's networks carry only a small amount of information, say ten or twenty packets and never develop large windows. Thus, the loss of a single packet can force the connection into timeout.

Figure 3:
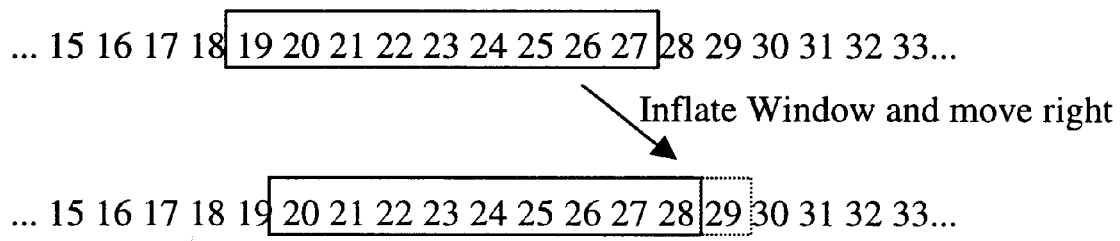
FIG. 3 shows that the window is inflated and moved when a non-duplicate ACK is received.
Figure 4:
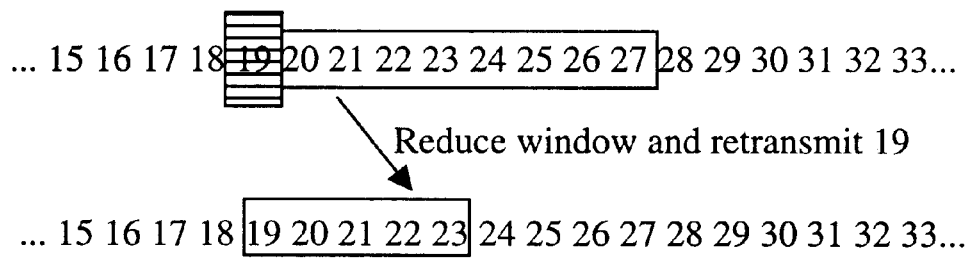
FIG. 4 shows the window when a packet is lost.

There are two operations on the C-WND and they are shown in FIGS. 3 and 4 respectively:

(a) Inflate Window (FIG. 3)

When a non-duplicate ACK is received, C-WND is inflated by extending the window's right edge and moves to the right so that the first byte in the window is the earliest unacknowledged byte. The inflation factor is a function of the TCP implementation.

(b) Deflate Window (FIG. 4)

When packet loss occurs the window is reduced in size by retracting the window's right edge and the packet is retransmitted.

The transport system is required to provide some minimum level of bandwidth for the total traffic between any pair of access points. As mentioned earlier, usually TCP will reduce its sending rate very aggressively when a packet is lost. It is envisaged however that TCP can be modified to cause it to reduce sending rate to some configured number rather than,just reducing it by a fixed amount such as one half. The configured number will assure that the connection can always run at a minimum rate. It is also envisaged in some instances that TCP can be constrained to a maximum rate, less than it would achieve normally so that a connection would not occupy all the available bandwidth.

Therefore, if the guaranteed minimum bandwidth is known and the round trip time (RTT) between the end points is known or has been estimated, then the TCP sender node needs only reduce its window to that which corresponds to a sending rate equal to that configured number. In this way the protocol will still probe for extra, opportunistic bandwidth but will be able to maintain the minimum rate. Similarly sending will be inhibited when the TCP window reaches a size corresponding to the maximum bandwidth.

This invention introduces the concept of overlay windows. This concept makes it easy to understand the design intent and permits the modification to be added without having to make substantial changes to the main body of standard TCP operating code.

According to one embodiment, TCP is modified to cause it to constrain its sending rate to be between some configured minimum and/or maximum numbers rather than between one packet and the receiver window size (R-WND). This modification is only needed at the TCP transmitter. The configured minimum number will assure that the connection can always run at a minimum rate and the configured maximum number prevents all the available bandwidth of the connection from being taken by a node pair. The modification to the TCP transmitter will also improve TCP's resilience in the sense that the connection will not experience exponentially increasing time out under packet loss. This improved resilience against packet loss is achieved without loading the network more than the desired guaranteed minimum bandwidth for the TCP connection, or one packet per the round trip time of the connection. As well as providing for a guaranteed minimum rate during the lifetime of a connection, this modification can also be enabled selectively to prevent time-out at the times when the window size of the connection is too small to allow fast retransmission and recovery.

As mentioned earlier, in normal TCP the sender is allowed to send some number of packets while waiting for an acknowledgment of an earlier packet and this number is referred to as the window. Arithmetically, one can see that the maximum rate that a connection can achieve is equal to the window size divided by the round trip time of the connection (RTT) in seconds. To assure a guaranteed minimum bandwidth (GMB bytes per second) it is necessary that the connection can always send at least GMB times RTT bytes in any RTT period and that the connection is not stalled by lost packets but will keep sending unless the normal keepalive process closes the connection.

According to one embodiment, the TCP transmitter uses following variables:

GMB: The guaranteed minimum bandwidth in bytes per second. This is a new, configured parameter.

MPB: The maximum permitted bandwidth in bytes per second. This is a new, configured parameter.

RTT: The estimated round trip time of the connection in seconds.

R-WND: The maximum window size acceptable to the receiver (as advertised by the receiver in conjunction with acknowledgements).

C-WND: The size of the congestion window as computed by the existing TCP algorithm.

MIN-WND: This is a sliding window based on the guaranteed minimum bandwidth. This is a new, computed variable MAX-WND: A sliding window based on the permitted maximum bandwidth. This is a new, computed variable.

Pkt: Packet size is the packet payload size currently used by the connection, in bytes.

RTO: TCP retransmission time-out value is the period, in seconds, after which, in the absence of acknowledgments, unacknowledged packets will be retransmitted. (Typically RTO is 1 sec or greater.)

OwT: Out-of-window send timer, in seconds, defines the time after which a packet can be sent even if the state of the TCP congestion window would normally not allow it. (A suggested value of OwT is 0.2 secs.). This is a new configured parameter.

RsT: Resend timer period, in seconds, has a value larger of OwT, RTT,

Pkt/GMB but always smaller than RTO. This is a new, computed variable.

According to an embodiment of the invention, the guaranteed minimum bandwidth for a TCP connection is achieved as follows.

While the connection is open the transmitter can send one packet into the network if it is allowed by the sliding window advertised by the receiver and if any one of the following conditions are met:

C1: The transmitted packet is allowed by the normal TCP congestion window and not disallowed by MAX-WND C2: The transmitted packet is allowed by MIN-WND C3: RsT expires.

Figure 5:
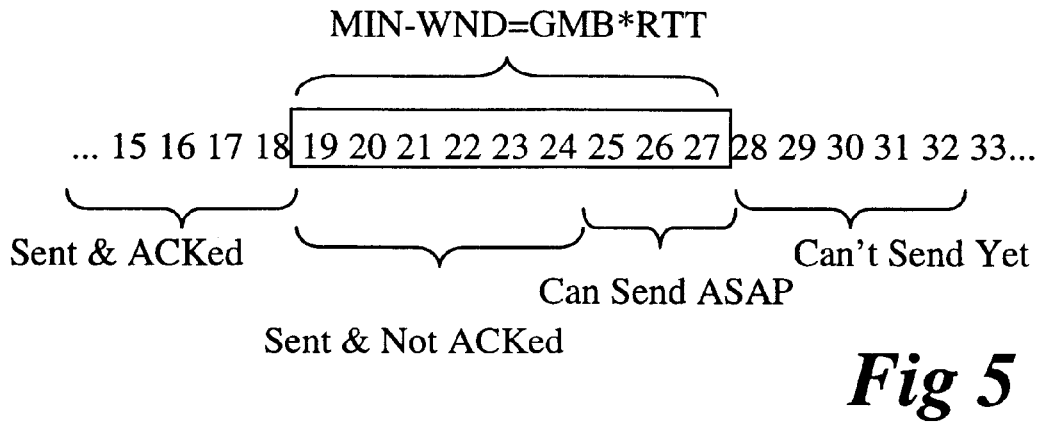
FIG. 5 shows the nature of MIN-WND according to an embodiment of the invention.

FIG. 5 shows the nature of MIN-WND, which is very similar to C-WIND except that the size does not change according to congestion but is tied to the value of GMB and RTT.

Figure 6:
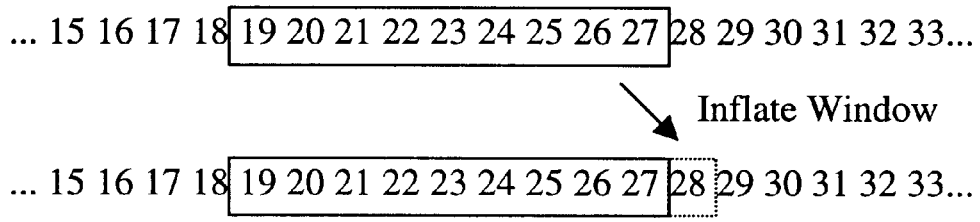
FIG. 6 shows the MIN-WND when a duplicate ACK is received.
Figure 7:
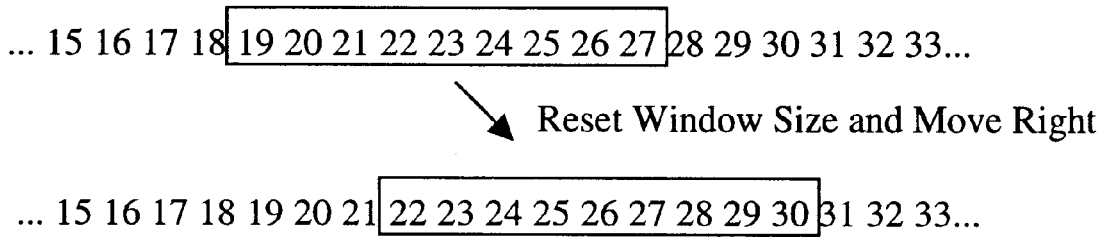
FIG. 7 shows the MIN-WND when a non-duplicate ACK is received.

There are two operations on the MIN-WND and they are shown in FIGS. 6 and 7:

(a) Inflate Window (FIG. 6)

When a duplicate ACK is received, MIN-WND is inflated by 1 Pkt by extending the window's right edge.

(b) Reset Window Size and Move Right (FIG. 7)

When a non duplicate ACK is received, MIN-WND resets to its original size (GMB*RTT), and moves to the right so that the first byte in the window is the earliest unacknowledged byte.

As seen in the figures, when a duplicate acknowledgement is received the window is inflated by one packet. The reception of an acknowledgment shows that the receiver has received a packet even if it was not is sequence. The inflation of the window ensures that the connection can continue sending new packets even when an acknowledgement is missing. A new packet will be sent for each duplicate acknowledgement received. This prevents the connection stalling but does not increase the number of packets in the network. However, as soon as a non-duplicate acknowledgement is received the window is reset to the normal size.

Figure 8:
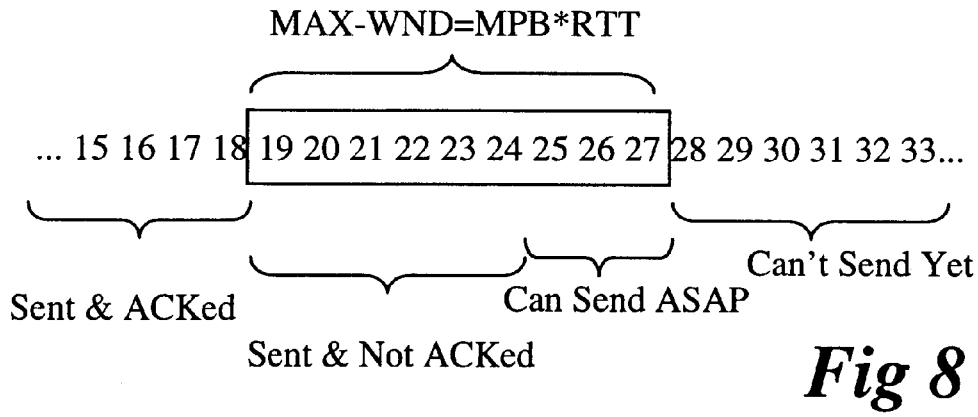
FIG. 8 shows the nature of MAX-WND according to an embodiment of the invention.

Similarly FIG. 8 shows the format of MAX-WND which is identical to MIN-WND except that the size is based on the maximum permitted bandwidth.

Figure 9:
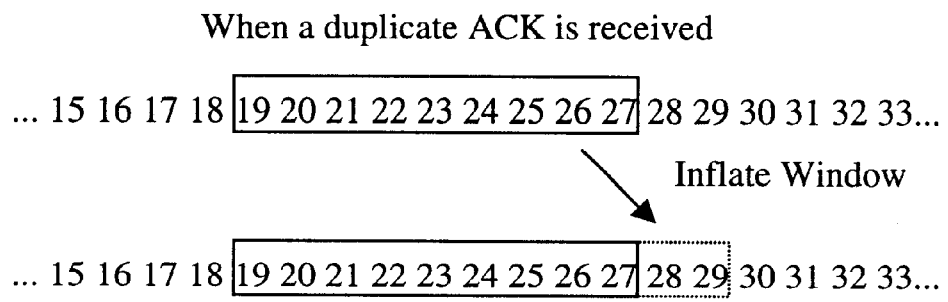
FIG. 9 shows the MAX-WND when a duplicate ACK is received.
Figure 10:
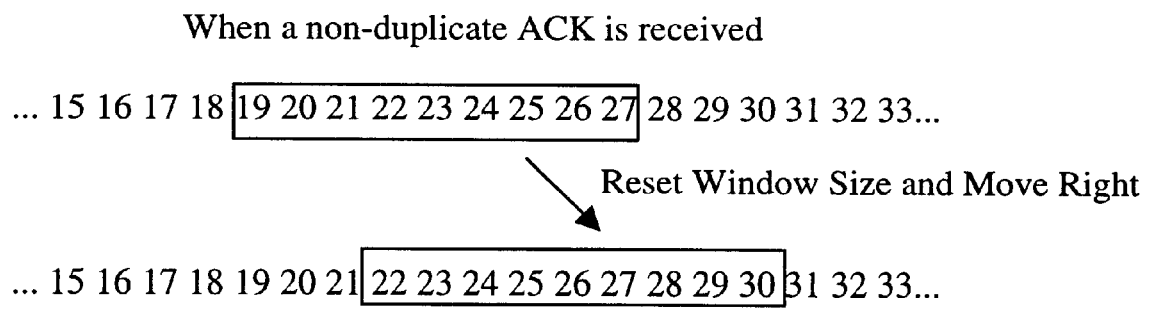
FIG. 10 shows the MAX-WND when a non-duplicate ACK is received.

Like the windows described thus far, there are two operations on the MAX-WND and they are shown in FIGS. 9 and 10:

(a) Inflate Window (FIG. 9)

When a duplicate ACK is received, MAX-WND is inflated by 1 Pkt by extending the window's right edge.

(b) Reset Window Size and Move Right (FIG. 10)

When a non duplicate ACK is received, MAX-WND resets to its original size (MPB*RTT), and moves to the right so that the first byte in the window is the earliest unacknowledged byte.

FIGS. 9 and 10 therefore show that the window is also inflated when duplicate acknowledgements are received and reset when a non-duplicate acknowledgement is seen.

Figure 11:
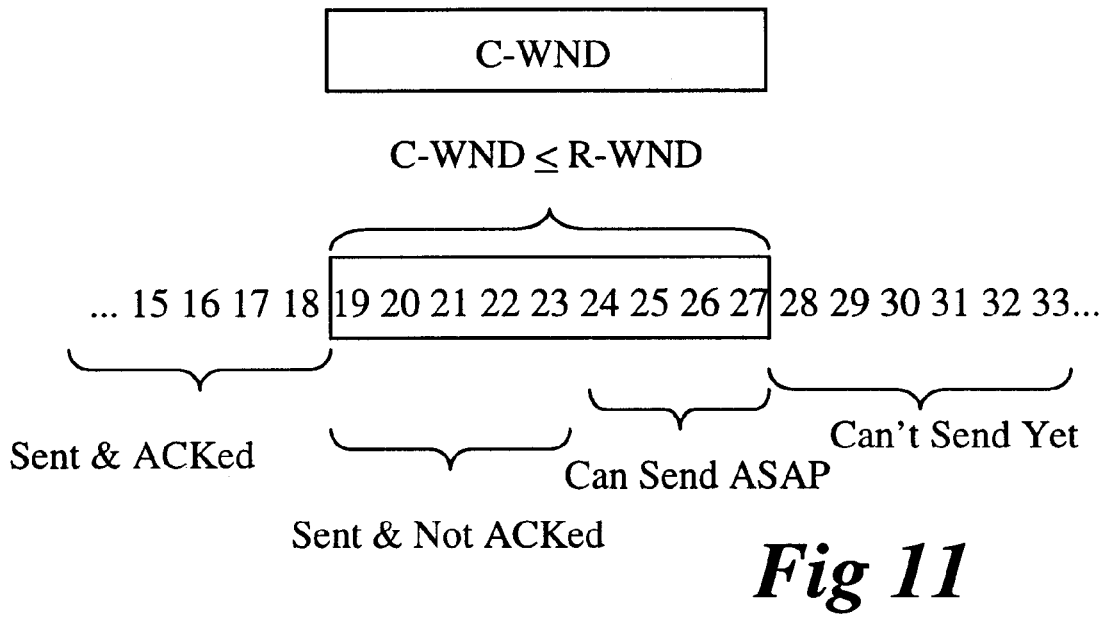
FIGS. 11–14 show the relationships of various windows.
Figure 12:
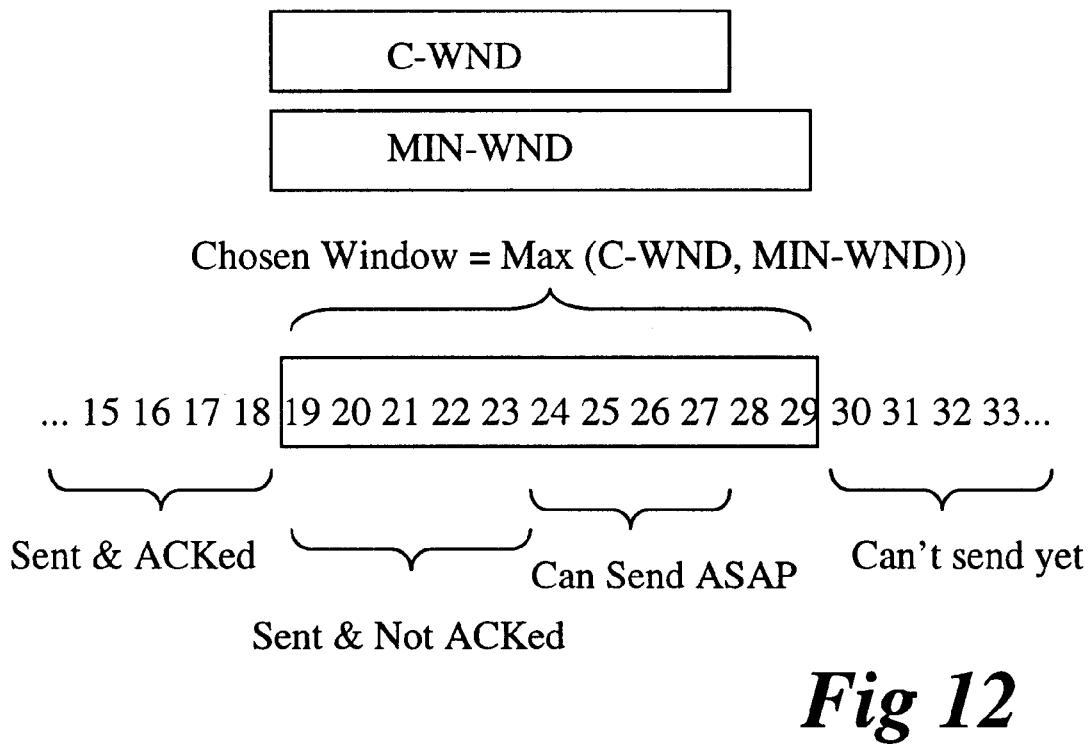
Figure 13:
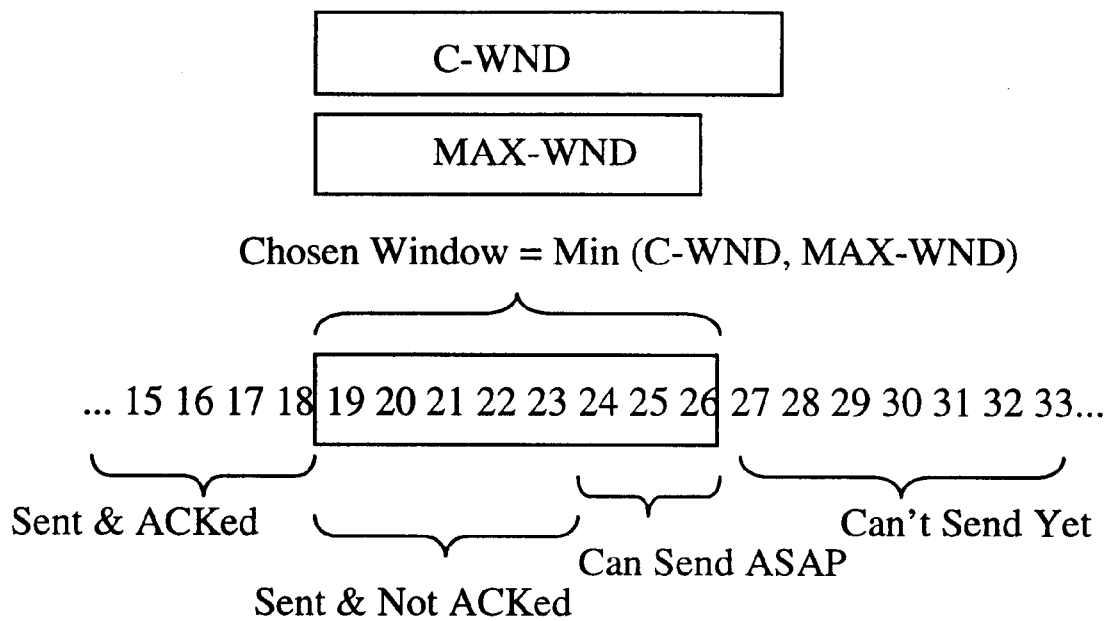
Figure 14:
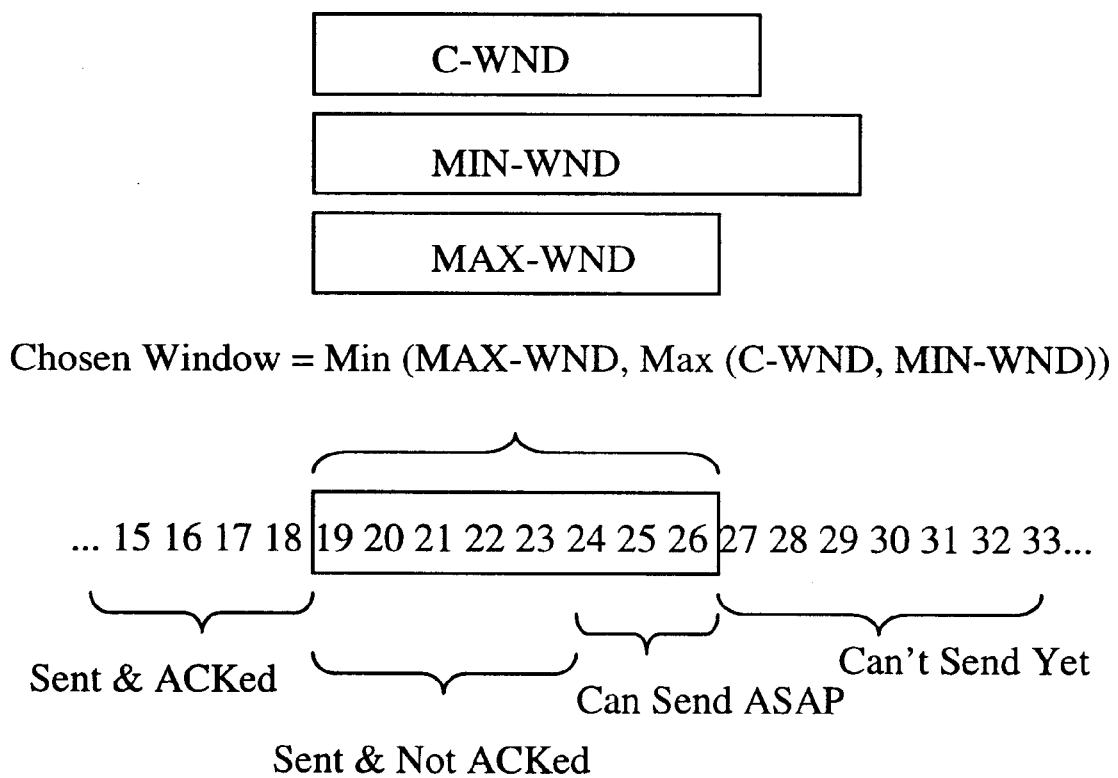

FIGS. 11 to 14 show unmodified TCP algorithm and the overlay methods of modifying the TCP algorithm, according to embodiments of the invention. In these embodiments, the chosen window is defined as being the maximum acceptable window after taking into account the requirements of the overlay rules. Therefore, FIG. 11 shows unmodified TCP where the chosen window is the normal congestion window and can have a value between 1 and R-WND. FIG. 12 on the other hand shows how, when the highest sequence number within C-WND falls below that of MIN-WND, the GMB overlay takes effect and the chosen window is equal to MIN-WND. Similarly in FIG. 13, when the highest sequence number of C-WND becomes greater than that of MAX-WND, the MPB overlay takes effect and chosen window becomes equal to MAX-WND. FIG. 14 shows how MIN-WND and MAX-WND are overlaid on the normal TCP algorithm to provide the complete bandwidth control.

When the rate of sending is between the configured limits the normal TCP algorithm controls the rate. If the rate tends to fall below the minimum then MIN-WND comes into play. If the rate reaches the maximum then MAX-WND takes effect. The normal TCP mechanism is still in control of reliability and of elasticity within the configured limits. An overriding timer RsT ensures that even when no acknowledgements are being received, a minimum rate of packets are still sent to stimulate acknowledgements and eventually retransmission without being stalled by TCP timeout.

Figure 15:
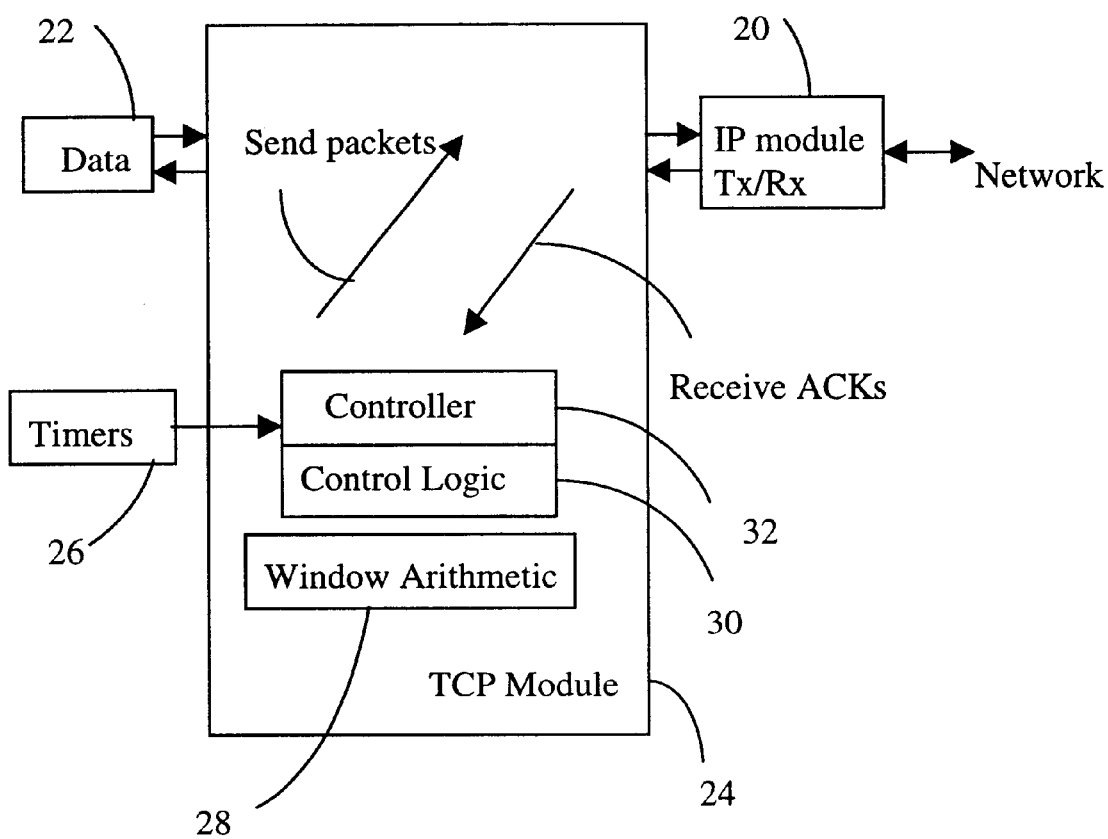
FIG. 15 is a block diagram of a TCP node.

FIG. 15 illustrates schematically in block diagram a TCP node according to one embodiment of the invention. The node is connected to a network and includes a transmitter and receiver of an IP module 20. The customer data 22 is processed by a TCP module 24 which forms the data into TCP packets before the transmitter send them into the network. In receive direction, of course, the module extracts the customer data and transfers it to the customer's terminal for outputting. The clock 26 generates clock signals which times a variety of operations of the node. The arithmetic module 28 is shown in a separate box which performs computations described thus far under control of the control logic 30. Controller 32 supervises the over-all operation of TCP module.

ASSERTIONS

A1. The TCP connection is allowed to transmit at least GMB*RTT bytes per RTT except while recovering from missing acknowledgements.

A2. The TCP connection will not stop transmitting for a period longer than RsT under any circumstances of packet loss, until a normal TCP timeout causes the connection to close.

A3. The loading of the network by the transmitter is at most the maximum of GMB and Pkt/RsT, unless more is allowed by the TCP congestion window within the limits of MPB. (RsT is always greater than or equal to RTT)

A4. In the presence of sufficient bandwidth, the TCP connection is able to sustain a maximum rate of MPB*RTT bytes per RTT except while recovering from missing acknowledgements.

It should be noted that it is a necessary requirement that an admission process will limit the number of TCP connections sharing a network link, so that the sum of GMBs for all the TCP connections including TCP and IP header overheads is no more than the link bandwidth.

It should also be noted that even when a guaranteed minimum bandwidth is not wanted for the whole duration of a flow, the application of this modification would improve performance for short flows of less than say ten or twenty packets by preventing TCP time-out which normally occurs after a single packet loss. In this case the modification could be enabled while the flow was in a fragile state and turned off once a certain number of packets were successfully sent.

What we claim as our invention is:

1. A method of sending packets via a connection by way of a sliding window algorithm in which a flow of data into the connection is controlled in response to acknowledged packets and the connection observing either or both of a guaranteed minimum bandwidth and a maximum permitted bandwidth, comprising the steps of:

(a) calculating a congestion window hereinafter called C-WND of the connection;

(b) setting either or both of a guaranteed minimum bandwidth and a maximum permitted bandwidth and then respectively calculating either or both of a guaranteed minimum bandwidth window hereinafter called MIN-WND and a maximum permitted bandwidth hereinafter called MAX-WND;

(c) determining if the MIN-WND or MAX-WND is invoked on the connection, based on their relationship with C-WND;

(d) allowing a transmission of one or more packets of data into the connection if either MIN-WND or MAX-WND permits the transmission; and (e) inflating either or both of MIN-WND and MAX-WND in response to each duplicate acknowledgement;

wherein step (c) is performed by comparing either C-WND and MIN-WND or C-WND and MAX-WND.

2. The method of sending data packets via a connection by way of a sliding window algorithm, according to claim 1 comprising the further steps of (f) counting a reset timer hereinafter called RsT in connection with the congestion window; and (g) allowing the transmission of one or more packets of data into the connection if at least one of C-WND, MIN-WND and RsT permits the transmission.

3. The method of sending data packets via a connection by way of a sliding window algorithm, according to claim 2 wherein steps (c) and (d) are performed only during a portion of the connection period.

4. The method of sending data packets via a connection by way of a sliding window algorithm, according to claim 2, wherein the connection is a TCP connection.

5. The method of sending data packets via a connection by way of a sliding window algorithm, according to claim 1 wherein steps (c) and (d) are performed only during a portion of the connection period.

6. The method of sending data packets via a connection by way of a sliding window algorithm, according to claim 1 comprising the further steps of:

(h) counting a reset timer hereinafter called RsT in connection with the congestion window; and (i) allowing the transmission of one or more packets of data into the connection if at least one of C-WND, MAX-WND and RsT permits the transmission.

7. The method of sending data packets via a connection by way of a sliding window algorithm, according to claim 6, wherein steps (c) and (d) are performed only during a portion of the connection period.

8. The method of sending data packets via a connection by way of a sliding window algorithm, according to claim 6, wherein the connection is a TCP connection.

9. An apparatus for sending data in packets via a connection by way of a sliding window algorithm in which a flow of data into the connection is controlled in response to acknowledged packets and the connection observing either or both of a guaranteed minimum bandwidth and a maximum permitted bandwidth, comprising:

a flow control module for controlling a flow of packets into the connection in response to acknowledged packets;

a congestion window arithmetic module for calculating a congestion window hereinafter called C-WND of the connection;

a bandwidth monitoring window arithmetic module for setting either or both of a guaranteed minimum bandwidth and a maximum permitted bandwidth and then respectively calculating either or both of a guaranteed minimum window hereinafter called MIN-WND and a maximum permitted bandwidth hereinafter called MAX-WND;

a control logic module for determining if the MIN-WND or MAX-WND is invoked on the connection;

a transmitter for transmitting a series of packets of data into the connection;

a controller for allowing a transmission of one or more packets of data into the connection if either MIN-WND or MAX-WND permits the transmission;

a packetizing module for packetizing data to be sent into a series of packets, each having an individual sequence number; and a clock for timing operations of various modules;

wherein the packet of data is a TCP packet of data and the apparatus further comprises:

a TCP protocol module for forming series of TCP packets of data, each having a sequence byte number; and the flow control module controls a flow of packets into the connection in response to acknowledged sequence byte numbers of the TCP packets of data;

wherein the flow control module comprises further a window control module for adjusting the size of either or both MIN-WND and MAX-WND in response to each duplicate ACK.

* * * * *